(12) United States Patent
Johnson et al.

(10) Patent No.: US 9,467,605 B2
(45) Date of Patent: Oct. 11, 2016

(54) SHUTTER FOR THERMAL IMAGING CAMERA

(71) Applicant: Fluke Corporation, Everett, WA (US)

(72) Inventors: Kirk R. Johnson, Rogers, MN (US); Justin M. Sheard, Rogers, MN (US)

(73) Assignee: Fluke Corporation, Everett, WA (US)

( * ) Notice: Subject to any disclaimer, the term of this patent is extended or adjusted under 35 U.S.C. 154(b) by 643 days.

(21) Appl. No.: 13/743,000

(22) Filed: Jan. 16, 2013

(65) Prior Publication Data

US 2014/0198217 A1    Jul. 17, 2014

(51) Int. Cl.
| | |
|---|---|
| *G03B 9/08* | (2006.01) |
| *H04N 5/225* | (2006.01) |
| *H04N 5/238* | (2006.01) |
| *H04N 5/33* | (2006.01) |

(52) U.S. Cl.
CPC .............. *H04N 5/2254* (2013.01); *G03B 9/08* (2013.01); *H04N 5/238* (2013.01); *H04N 5/332* (2013.01)

(58) Field of Classification Search
CPC ...... H04N 5/33; H04N 5/332; H04N 5/2254; G03B 17/04; G01J 5/524
USPC .................................................... 396/448, 452
See application file for complete search history.

(56) References Cited

U.S. PATENT DOCUMENTS

| | | | | |
|---|---|---|---|---|
| 4,384,569 | A  * | 5/1983 | Clearman | F24J 2/16 126/617 |
| 5,127,742 | A  * | 7/1992 | Fraden | 374/129 |
| 2006/0152093 | A1* | 7/2006 | Oishi et al. | 310/36 |
| 2008/0060636 | A1* | 3/2008 | Tuchelt | 126/701 |
| 2012/0177180 | A1* | 7/2012 | Van Lemel et al. | 378/70 |
| 2012/0312976 | A1* | 12/2012 | Boulanger | H04N 5/33 250/252.1 |

* cited by examiner

*Primary Examiner* — Minh Phan
(74) *Attorney, Agent, or Firm* — Fredrikson & Byron, P.A.

(57) ABSTRACT

Various embodiments of shutters for thermal imaging cameras, cameras comprising such shutters, and methods for providing such shutters are disclosed. The shutter may include a substrate with various layers and components thereon, such as a temperature sensor. The shutter may resemble a printed circuit board (PCB), utilizing efficient, cost-effective materials and methods known in the art.

21 Claims, 10 Drawing Sheets

SHUTTER FOR THERMAL IMAGING CAMERA

BACKGROUND

Thermal imaging cameras are used in a variety of situations. For example, thermal imaging cameras are often used during maintenance inspections to thermally inspect equipment. Example equipment may include rotating machinery, electrical panels, or rows of circuit breakers, among other types of equipment. Thermal inspections can detect equipment hot spots such as overheating machinery or electrical components, helping to ensure timely repair or replacement of the overheating equipment before a more significant problem develops.

Depending on the configuration of the camera, the thermal imaging camera may also generate a visible light image of the same object. The camera may display the infrared image and the visible light image in a coordinated manner, for example, to help an operator interpret the thermal image generated by the thermal imaging camera. Unlike visible light images which generally provide good contrast between different objects, it is often difficult to recognize and distinguish different features in a thermal image as compared to the real-world scene. For this reason, an operator may rely on a visible light image to help interpret and focus the thermal image.

In applications where a thermal imaging camera is configured to generate both a thermal image and a visual light image, the camera may include two separate sets of optics: visible light optics that focus visible light on a visible light sensor for generating the visible light image, and infrared optics that focus infrared radiation on an infrared sensor for generating the infrared image.

Thermal imaging cameras may additionally comprise a shutter for use in various applications. Shutters may be used to block incident infrared radiation from the camera's sensing elements, to provide a uniform scene and/or a scene of known temperature to the camera for calibration and/or calculation purposes, such as for non-uniformity correction (NUC). For such purposes, it is often desirable to know the temperature of the shutter. Incorporating a temperature sensor may be costly and may negatively impact other functions of the shutter. Additionally, traditional metallic shutters are easily bent and difficult to maintain as a flat surface. Moreover, such metallic shutters often require a painting process to create shutter surfaces of the proper emissivity.

SUMMARY

In general, this disclosure is directed to a shutter for a thermal imaging camera, and a camera comprising such a shutter, the shutter comprising a substrate with multiple layers thereon. Various layers on the shutter may serve various purposes and have various properties, such as high or low emissivity or thermal and/or electrical conductivity or resistivity.

Various methods and apparatuses fall within the scope of the present invention. Certain embodiments of the invention include a shutter comprising a generally flat, thermally and electrically insulating substrate with a first side and a second side, the shutter comprising first and second sections coupled to the first and second sides of the substrate. The first and second sections are intended to face towards and away from the sensors of the thermal imaging camera, respectively. The first section is configured to present a uniform thermal scene to the camera, and may comprise a thermally and electrically conductive layer and a high-emissivity layer to encourage uniform temperature and minimize internal reflections, respectively.

The first section of the shutter may additionally comprise a temperature sensor which may be used in calibration of the associated thermal imaging camera, and electrically conducting channels in order to relay the output of the temperature sensor. This configuration of componentry (temperature sensor), substrate, and layers may resemble that of a printed circuit board. Additionally, the second section of the shutter may comprise a low-emissivity coating for reflecting away energy incident on the shutter.

Additional aspects of embodiments of the invention may comprise thermal relief cuts in various layers of the shutter in order to prevent heat or electrical current flow across or between portions of the shutter. Other embodiments may comprise an aperture in the shutter intended to attenuate incident signals rather than block them entirely.

Methods for providing such a shutter and thermal imaging cameras incorporating such a shutter also fall within the scope of the present invention. The details of one or more examples and embodiments of the invention are set forth in the accompanying drawings and the description below. Other features, objects, and advantages will be apparent from the description and drawings, as well as from the claims of the invention.

The details of one or more examples are set forth in the accompanying drawings and the description below. Other features, objects, and advantages will be apparent from the description and drawings, and from the claims.

DETAILED DESCRIPTION

The following detailed description is exemplary in nature and is not intended to limit the scope, applicability, or configuration of the invention in any way. Rather, the following description provides some practical illustrations for implementing examples of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

A thermal imaging camera may be used to detect heat patterns across a scene under observation. The thermal imaging camera may detect infrared radiation given off by the scene and convert the infrared radiation into an infrared image indicative of the heat patterns. In some examples, the thermal imaging camera may also capture visible light from the scene and convert the visible light into a visible light image. Depending on the configuration of the thermal imaging camera, the camera may include infrared optics to focus the infrared radiation on an infrared sensor and visible light optics to focus the visible light on a visible light sensor.

Shutters may be used for several applications within a thermal imaging camera. Such applications include but are not limited to blocking radiation from impinging on sensing elements, providing a uniform scene to the thermal imaging camera, or providing a scene of known temperature to a thermal imaging camera. Certain embodiments of the present invention comprise a shutter designed to better perform at least one such application than the present state of the art, and/or a thermal imaging camera comprising such a shutter.

Figure 1:
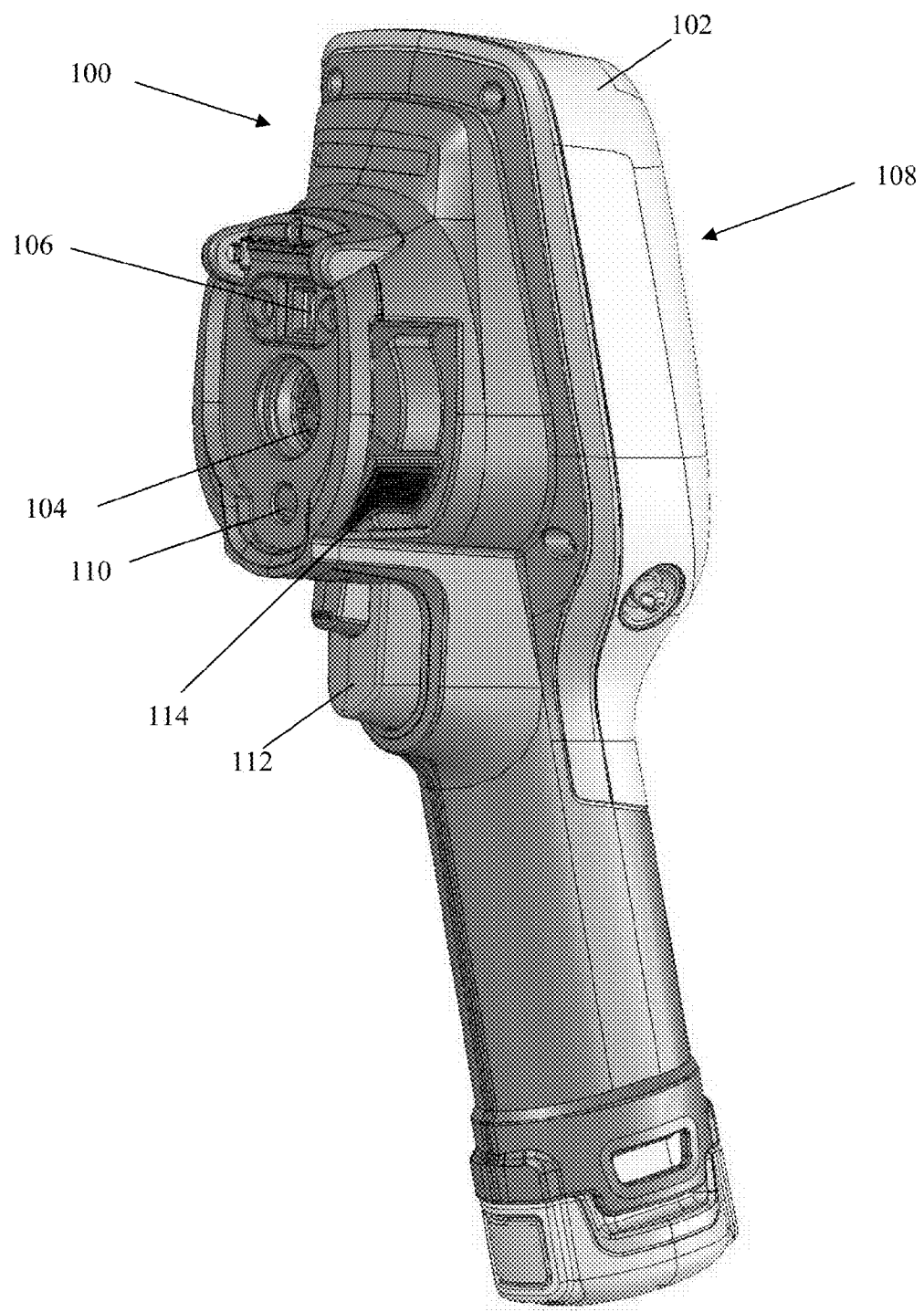
FIG. 1 is a perspective front view of an example thermal imaging camera.
Figure 2:
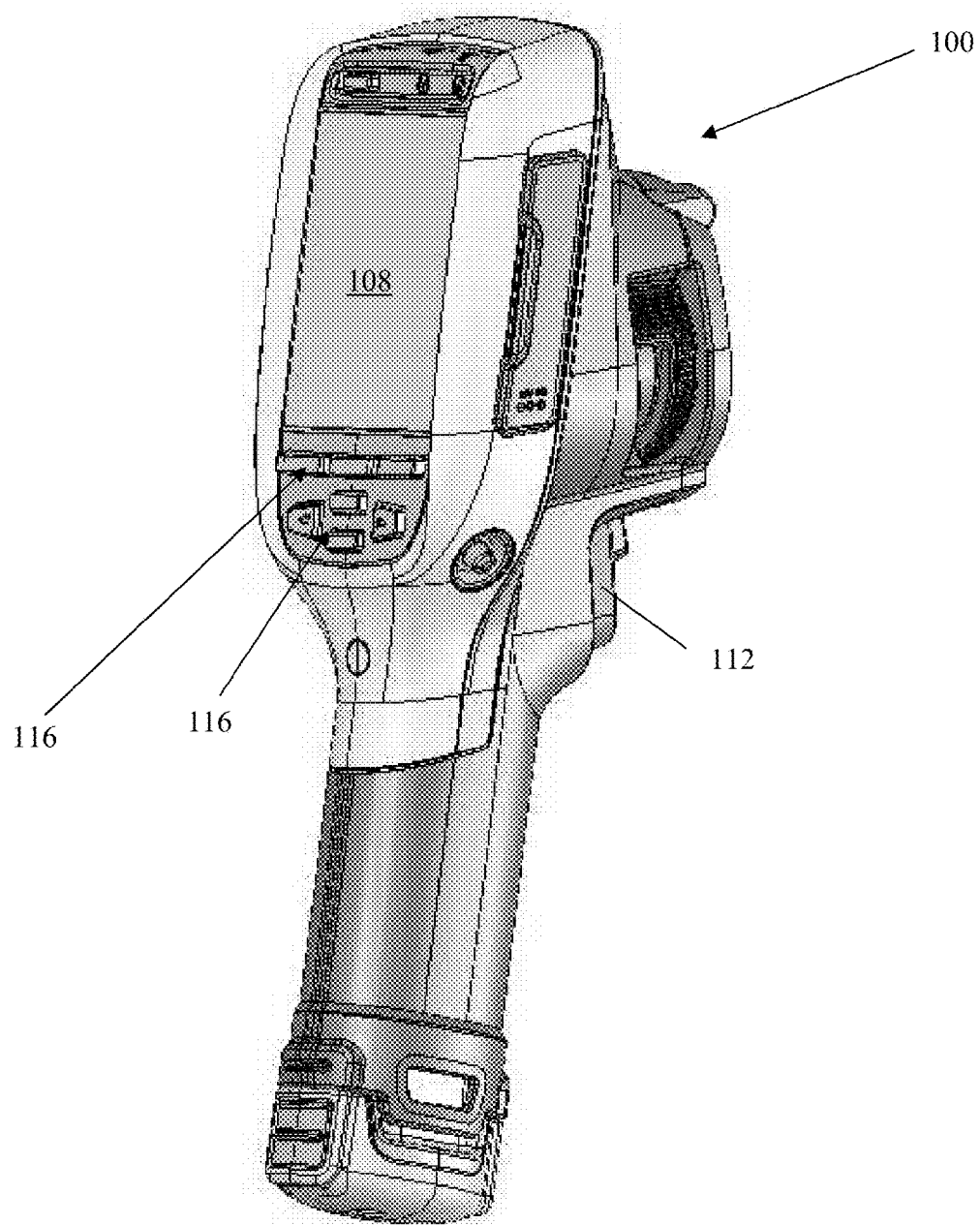
FIG. 2 is a perspective back view of the example thermal imaging camera of FIG. 1.

FIGS. 1 and 2 show front and back perspective views, respectively of an example thermal imaging camera 100, which includes a housing 102, an infrared lens assembly 104, a visible light lens assembly 106, a display 108, a laser 110, and a trigger control 112. Housing 102 houses the various components of thermal imaging camera 100. The bottom portion of thermal imaging camera 100 includes a carrying handle for holding and operating the camera via one hand. Infrared lens assembly 104 receives infrared radiation from a scene and focuses the radiation on an infrared sensor for generating an infrared image of a scene. Visible light lens assembly 106 receives visible light from a scene and focuses the visible light on a visible light sensor for generating a visible light image of the same scene. Thermal imaging camera 100 captures the visible light image and/or the infrared image in response to depressing trigger control 112. In addition, thermal imaging camera 100 controls display 108 to display the infrared image and the visible light image generated by the camera, e.g., to help an operator thermally inspect a scene. Thermal imaging camera 100 may also include a focus mechanism coupled to infrared lens assembly 104 that is configured to move at least one lens of the infrared lens assembly so as to adjust the focus of an infrared image generated by the thermal imaging camera.

In operation, thermal imaging camera 100 detects heat patterns in a scene by receiving energy emitted in the infrared-wavelength spectrum from the scene and processing the infrared energy to generate a thermal image. Thermal imaging camera 100 may also generate a visible light image of the same scene by receiving energy in the visible light-wavelength spectrum and processing the visible light energy to generate a visible light image. As described in greater detail below, thermal imaging camera 100 may include an infrared camera module that is configured to capture an infrared image of the scene and a visible light camera module that is configured to capture a visible light image of the same scene. The infrared camera module may receive infrared radiation projected through infrared lens assembly 104 and generate therefrom infrared image data. The visible light camera module may receive light projected through visible light lens assembly 106 and generate therefrom visible light data.

In some examples, thermal imaging camera 100 collects or captures the infrared energy and visible light energy substantially simultaneously (e.g., at the same time) so that the visible light image and the infrared image generated by the camera are of the same scene at substantially the same time. In these examples, the infrared image generated by thermal imaging camera 100 is indicative of localized temperatures within the scene at a particular period of time while the visible light image generated by the camera is indicative of the same scene at the same period of time. In other examples, thermal imaging camera may capture infrared energy and visible light energy from a scene at different periods of time.

Visible light lens assembly 106 includes at least one lens that focuses visible light energy on a visible light sensor for generating a visible light image. Visible light lens assembly 106 defines a visible light optical axis which passes through the center of curvature of the at least one lens of the assembly. Visible light energy projects through a front of the lens and focuses on an opposite side of the lens. Visible light lens assembly 106 can include a single lens or a plurality of lenses (e.g., two, three, or more lenses) arranged in series. In addition, visible light lens assembly 106 can have a fixed focus or can include a focus adjustment mechanism for changing the focus of the visible light optics. In examples in which visible light lens assembly 106 includes a focus adjustment mechanism, the focus adjustment mechanism may be a manual adjustment mechanism or an automatic adjustment mechanism.

Infrared lens assembly 104 also includes at least one lens that focuses infrared energy on an infrared sensor for generating a thermal image. Infrared lens assembly 104 defines an infrared optical axis which passes through the center of curvature of lens of the assembly. During operation, infrared energy is directed through the front of the lens and focused on an opposite side of the lens. Infrared lens assembly 104 can include a single lens or a plurality of lenses (e.g., two, three, or more lenses), which may be arranged in series.

As briefly described above, thermal imaging camera 100 includes a focus mechanism for adjusting the focus of an infrared image captured by the camera. In the example shown in FIGS. 1 and 2, thermal imaging camera 100 includes focus ring 114. Focus ring 114 is operatively coupled (e.g., mechanically and/or electrically coupled) to at least one lens of infrared lens assembly 104 and configured to move the at least one lens to various focus positions so as to focus the infrared image captured by thermal imaging camera 100. Focus ring 114 may be manually rotated about at least a portion of housing 102 so as to move the at least one lens to which the focus ring is operatively coupled. In some examples, focus ring 114 is also operatively coupled to display 108 such that rotation of focus ring 114 causes at least a portion of a visible light image and at least a portion of an infrared image concurrently displayed on display 108 to move relative to one another. In different examples, thermal imaging camera 100 may include a manual focus adjustment mechanism that is implemented in a configuration other than focus ring 114.

During operation of thermal imaging camera 100, an operator may wish to view a thermal image of a scene and/or a visible light image of the same scene generated by the camera. For this reason, thermal imaging camera 100 may include a display. In the examples of FIGS. 1 and 2, thermal imaging camera 100 includes display 108, which is located on the back of housing 102 opposite infrared lens assembly 104 and visible light lens assembly 106. Display 108 may be configured to display a visible light image, an infrared image, and/or a composite image that is a simultaneous display of the visible light image and the infrared image. In different examples, display 108 may be remote (e.g., separate) from infrared lens assembly 104 and visible light lens assembly 106 of thermal imaging camera 100, or display 108 may be in a different spatial arrangement relative to infrared lens assembly 104 and/or visible light lens assembly 106. Therefore, although display 108 is shown behind infrared lens assembly 104 and visible light lens assembly 106 in FIG. 2, other locations for display 108 are possible.

Thermal imaging camera 100 can include a variety of user input media for controlling the operation of the camera and adjusting different settings of the camera. Example control functions may include adjusting the focus of the infrared and/or visible light optics, opening/closing a shutter, capturing an infrared and/or visible light image, or the like. In the example of FIGS. 1 and 2, thermal imaging camera 100 includes a depressible trigger control 112 for capturing an infrared and visible light image, and buttons 116, which form part of the user interface, for controlling other aspects of the operation of the camera. A different number or arrangement of user input media are possible, and it should be appreciated that the disclosure is not limited in this respect. For example, thermal imaging camera 100 may include a touch screen display 108 which receives user input by depressing different portions of the screen.

Figure 3:
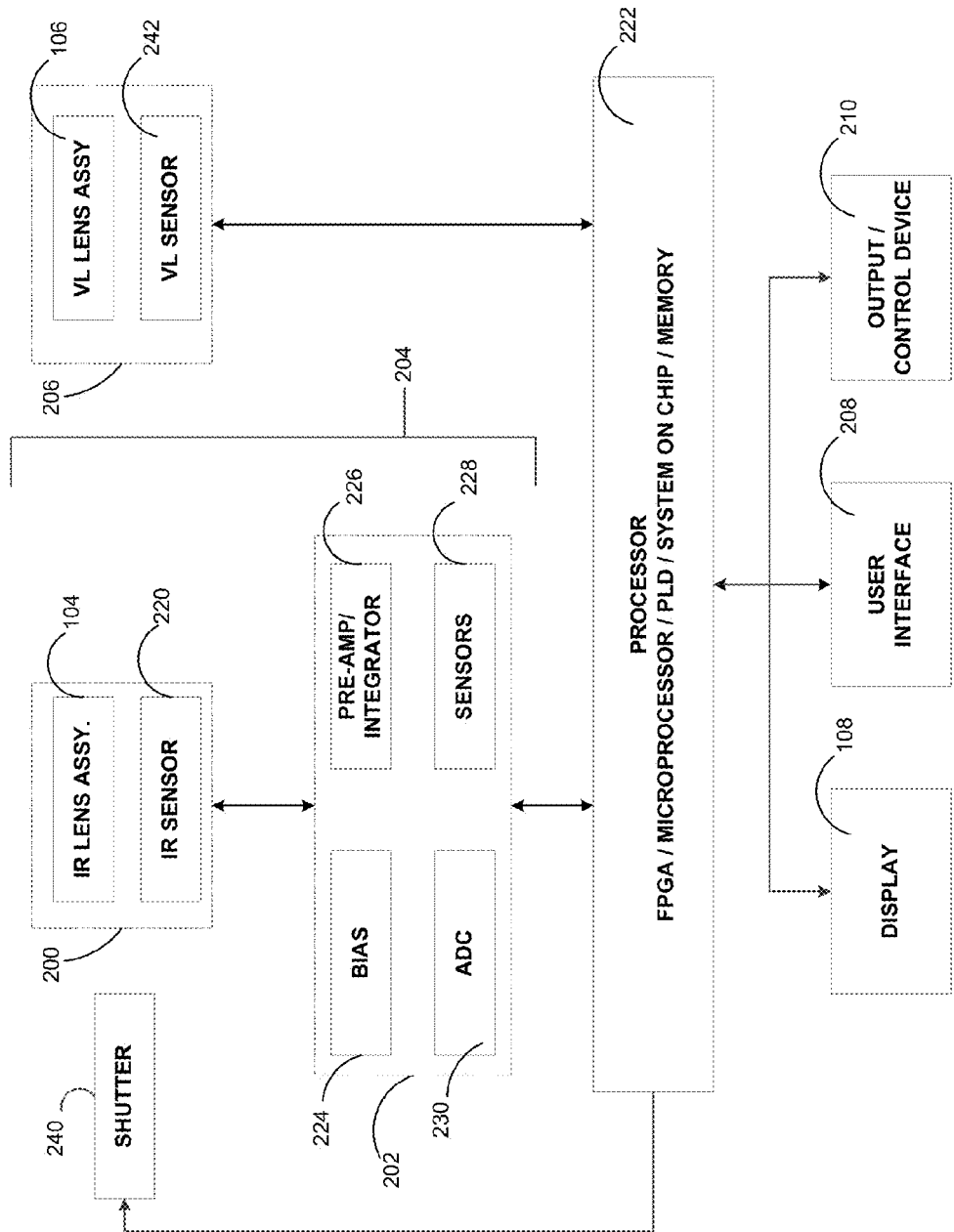
FIG. 3 is a functional block diagram illustrating example components of the thermal imaging camera of FIGS. 1 and 2.

FIG. 3 is a functional block diagram illustrating components of an example of thermal imaging camera 100. Thermal imaging camera 100 includes an IR camera module 200, front end circuitry 202. The IR camera module 200 and front end circuitry 202 are sometimes referred to in combination as front end stage or front end components 204 of the infrared camera 100. Thermal imaging camera 100 may also include a visible light camera module 206, a display 108, a user interface 208, and an output/control device 210.

Infrared camera module 200 may be configured to receive infrared energy emitted by a target scene and to focus the infrared energy on an infrared sensor for generation of infrared energy data, e.g., that can be displayed in the form of an infrared image on display 108 and/or stored in memory. Infrared camera module 200 can include any suitable components for performing the functions attributed to the module herein. In the example of FIG. 3, infrared camera module 200 is illustrated as including infrared lens assembly 104 and infrared sensor 220. As described above with respect to FIGS. 1 and 2, infrared lens assembly 104 includes at least one lens that takes infrared energy emitted by a target scene and focuses the infrared energy on infrared sensor 220. Infrared sensor 220 responds to the focused infrared energy by generating an electrical signal that can be converted and displayed as an infrared image on display 108.

Infrared sensor 220 may include one or more focal plane arrays (FPA) that generate electrical signals in response to infrared energy received through infrared lens assembly 104. Each FPA can include a plurality of infrared sensor elements including, e.g., bolometers, photon detectors, or other suitable infrared sensor elements. In operation, each sensor element, which may each be referred to as a sensor pixel, may change an electrical characteristic (e.g., voltage or resistance) in response to absorbing infrared energy received from a target scene. In turn, the change in electrical characteristic can provide an electrical signal that can be received by a processor 222 and processed into an infrared image displayed on display 108.

Independent of the specific type of infrared sensor elements included in the FPA of infrared sensor 220, the FPA array can define any suitable size and shape. In some examples, infrared sensor 220 includes a plurality of infrared sensor elements arranged in a grid pattern such as, e.g., an array of sensor elements arranged in vertical columns and horizontal rows. In various examples, infrared sensor 220 may include an array of vertical columns by horizontal rows of, e.g., 16×16, 50×50, 160×120, 120×160 or 640×480. In other examples, infrared sensor 220 may include a smaller number of vertical columns and horizontal rows (e.g., 1×1), a larger number vertical columns and horizontal rows (e.g., 1000×1000), or a different ratio of columns to rows. In certain embodiments a Read Out Integrated Circuit (ROIC) is incorporated on the IR sensor 220. The ROIC is used to output signals corresponding to each of the pixels.

The front end circuitry 202 includes circuitry for interfacing with and controlling the IR camera module 200. In addition, the front end circuitry 202 initially processes and transmits collected infrared image data to a processor 222 via a connection therebetween. More specifically, the signals generated by the IR sensor 220 are initially conditioned by the front end circuitry 202 of the thermal imaging camera 100. In certain embodiments, as shown, the front end circuitry 202 includes a bias generator 224 and a pre-amp/integrator 226. In addition to providing the detector bias, the bias generator 224 can optionally add or subtract an average bias current from the total current generated for each switched-in detector element. The average bias current can be changed in order (i) to compensate for deviations to the entire array of resistances of the detector elements resulting from changes in ambient temperatures inside the thermal imaging camera 100 and (ii) to compensate for array-to-array variations in the average detector elements of the IR sensor 220. Such bias compensation can be automatically controlled by the thermal imaging camera 100 or software, or can be user controlled via input to the output/control device 210 or processor 222. Following provision of the detector bias and optional subtraction or addition of the average bias current, the signals can be passed through a pre-amp/integrator 226 for conditioning. Subsequently, the conditioned signals are sent downstream into the processor 222 of the thermal imaging camera 100.

In some embodiments, the front end circuitry 202 can include one or more additional elements for example, additional sensors 228 or an ADC 230.

In some embodiments, front end components can further include a shutter 240. A shutter 240 can be externally or internally located relative to the lens and operate to open or close the view provided by the IR lens assembly 104. As is known in the art, the shutter 240 can be mechanically positionable, or can be actuated by an electro-mechanical device such as a DC motor or solenoid. Certain embodiments of thermal imaging cameras comprise a shutter configured to block IR radiation from reaching the FPA. Additionally, some embodiments of the invention may include a calibration or setup software implemented method or setting which utilize the shutter 240 to establish appropriate bias levels for each detector element.

Components described as processors within thermal imaging camera 100, including processor 222, may be implemented as one or more processors, such as one or more microprocessors, digital signal processors (DSPs), application specific integrated circuits (ASICs), field programmable gate arrays (FPGAs), programmable logic circuitry, or the like, either alone or in any suitable combination. Processor 222 may also include memory that stores program instructions and related data that, when executed by processor 222, cause thermal imaging camera 100 and processor 222 to perform the functions attributed to them in this disclosure. Processor 222 may also be implemented as a System on Chip that integrates all components of a computer or other electronic system into a single chip. These elements manipulate the conditioned scene image data delivered from the front end stages 204 in order to provide output scene data that can be displayed or stored for use by the user. Subsequently, the processor 222 (processing circuitry) sends the processed data to a display 108 or other output/control device 210.

During operation of thermal imaging camera 100, processor 222 can control infrared camera module 200 to generate infrared image data for creating an infrared image. Processor 222 can generate a digital "frame" of infrared image data of a target scene at a given point in time.

Processor 222 can capture a single infrared image or "snap shot" of a target scene by measuring the electrical signal of each infrared sensor element included in the FPA of infrared sensor 220 a single time. Alternatively, processor 222 can capture a plurality of infrared images of a target scene by repeatedly measuring the electrical signal of each infrared sensor element included in the FPA of infrared sensor 220. Processor 222 may perform other operations in capturing an infrared image such as sequentially actuating a shutter 240 to open and close an aperture of infrared lens assembly 104, or the like. Processor 222 may perform computations to convert raw infrared image data into scene temperatures (radiometry) including, in some examples, colors corresponding to the scene temperatures.

Thermal imaging camera 100 includes visible light camera module 206. Visible light camera module 206 may be configured to receive visible light energy from a target scene and to focus the visible light energy on a visible light sensor for generation of visible light energy data, e.g., that can be displayed in the form of a visible light image on display 108 and/or stored in memory. Visible light camera module 206 can include any suitable components for performing the functions attributed to the module herein. In the example of FIG. 3, visible light camera module 206 is illustrated as including visible light lens assembly 106 and visible light sensor 242.

In these and other examples, processor 222 may control display 108 to concurrently display at least a portion of the visible light image captured by thermal imaging camera 100 and at least a portion of the infrared image captured by thermal imaging camera 100. In various examples, processor 222 may control display 108 to display the visible light image and the infrared image in side-by-side arrangement, in a picture-in-picture arrangement, where one of the images surrounds the other of the images, or any other suitable arrangement where the visible light and the infrared image are concurrently displayed.

For example, processor 222 may control display 108 to display the visible light image and the infrared image in a composite image. In a composite image, the visible light image and the infrared image may be superimposed on top of one another. An operator may interact with user interface 208 to control the transparency or opaqueness of one or both of the images displayed on display 108. For example, the operator may interact with user interface 208 to adjust the infrared image between being completely transparent and completely opaque and also adjust the visible light image between being completely transparent and completely opaque.

Additionally, in some embodiments, the processor 222 can interpret and execute commands from user interface 208, an output/control device 210. This can involve processing of various input signals and transferring those signals to the front end circuitry 202 via a connection therebetween. Components (e.g. motors, or solenoids) proximate the front end circuitry 202 can be actuated to accomplish the desired control function. Exemplary control functions can include adjusting the focus, opening/closing a shutter, triggering sensor readings, adjusting bias values, etc. Moreover, input signals may be used to alter the processing of the image data that occurs in the processor 222.

In many embodiments of thermal imaging cameras, shutters may serve several functions, including but not limited to blocking radiation from impinging on sensing elements, providing a uniform scene to the thermal imaging camera, or providing a scene of known temperature to a thermal imaging camera. It may be the case that a user does not wish for the sensing elements of a thermal imaging camera to be exposed to incident radiation at a certain time, and so might engage the shutter. Other processes such as radiometric calculations within a camera or biasing sensors to provide a more accurate representation of a thermal scene may require calibrations in which the shutter advantageously provides a uniform thermal scene and/or a scene of known temperature. Certain embodiments of the present invention comprise a shutter better suited than the current state of the art to perform tasks such as these.

Figure 4:
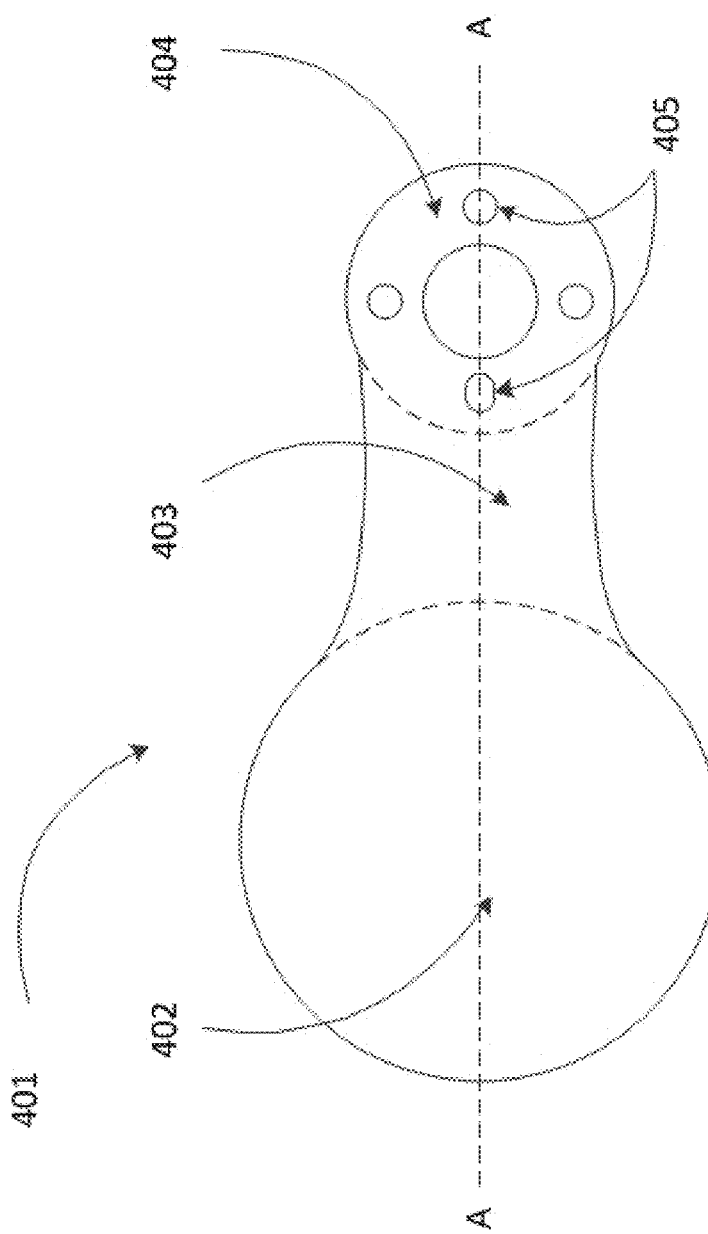
FIG. 4 is a plan view of an embodiment of the shutter.

FIG. 4 shows an outline of an embodiment of the invention. The shutter 401 comprises three portions—a flag portion 402, a stem portion 403, and an attachment portion 404 separated in FIG. 4 by broken lines. The flag portion 402 is designed to block the IR sensing array from incident IR energy when the shutter 401 is in the closed position. In certain embodiments, the flag portion 402 is located a minimal distance above its underlying structure when the shutter 401 is closed, as this configuration minimizes the amount of IR energy that may pass around the outside edges of shutter 401. The attachment portion 404 is designed to be operatively coupled to means that actuate the shutter 401, such as a motor, which may comprise a piezo motor. Mounting holes 405 are provided for operatively connecting attachment portion 404 to the actuator. The stem portion 403 separates the flag portion 402 from the attachment portion 404, fixing it at a distance in order to properly position the flag portion 402 over the IR sensing element when the shutter is closed and to move it sufficiently out of the way when shutter is open. Various embodiments of the invention may comprise flag, stem, and attachment portions of various relative shapes and sizes, or may integrate the functionality of two or more of these portions into a single portion.

Figure 5:
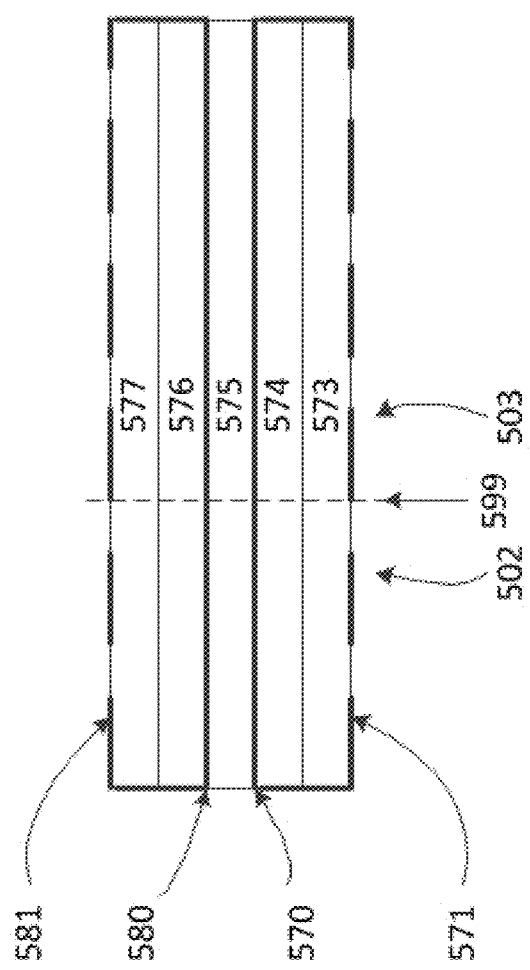
FIG. 5 is a cross-sectional schematic view of an embodiment of the shutter taken at line A in FIG. 4.

FIG. 5 shows a cross-sectional schematic view of an embodiment of the shutter taken at line A in FIG. 4. The relative thicknesses of the individual layers shown are not to scale, but are merely shown schematically. Additionally, the layers illustrated are exemplary and do not necessarily show the invention in full detail, as layers may comprise cuts, breaks, or other non-uniformity throughout the shutter. In this embodiment, the flag portion of the shutter comprises a substrate 575 that provides the base structure for the shutter. The substrate 575 may comprise a flat, stiff, lightweight, thermally and electrically insulating material such as FR-4, an inexpensive material often used, for example, in construction of printed circuit boards (PCB's). Such a material may help prevent the shutter from bending or allowing heat or electricity to conduct from one side of the shutter to the other.

The numerical range of electrical resistance and thermal insulation may vary from shutter to shutter as the substrate or other materials used changes. Electrically conductive substrates may be used, but may provide a challenge in the transmittance of electrical signals along the shutter. Thermally conductive substrates may also be used, however in this case the temperature of the shutter may be more prone to external thermal influences.

The substrate may comprise a first side and a second side generally opposite the first. The shutter may also comprise a first section and a second section, operatively coupled to the first and second sides of the substrate, respectively, as shown in FIG. 5. In this embodiment, the first section of the shutter is intended to generally face the IR sensor element of the camera while the second section is located generally opposite the first and is intended to generally face away from the IR sensor element, towards the thermal scene. While shown in FIG. 5 as being present in the flag portion of the shutter, the aforementioned first 571 and second 581 sections of the substrate may span the entire extent of the shutter.

As has been previously discussed, in a thermal imaging camera, a shutter may be used to establish appropriate bias levels for sensor elements. This is achievable by closing the shutter, blocking incident IR radiation to the sensor elements, and ensuring that each sensor element reads the same signal from the shutter. Of course, for this process to work, the shutter preferably presents a uniform thermal scene to the sensor elements. Otherwise, biasing each sensor element so that they all read the same from the shutter would be inducing inaccuracy into the device instead of reducing it.

To help facilitate the presentation of a uniform thermal scene to the IR sensing element, the first section 571 of the shutter may comprise an electrically and/or thermally conducting first layer 574. The thermal conductivity of the first layer 574 encourages any heat present in the layer to spread out quickly and uniformly, thereby creating a more uniform thermal profile viewed by the IR sensor elements, enabling the establishment of appropriate bias levels for the sensor elements. In some embodiments, this first layer is in direct contact with the first side 570 of the substrate 575.

Various materials are contemplated for use for the first layer, however some metals are appealing for having generally high thermal and electrical conductivity. In attempting to achieve thermal uniformity of the shutter, the more well-suited a material of high thermal conductivity may be.

While imaging a thermal scene with a thermal imaging camera, it is possible for the IR sensing elements to increase in temperature during operation. In doing so, the sensing elements may emit IR radiation indicative of this temperature increase. If the shutter is closed while this is occurring, it is advantageous for the shutter to be able to absorb the IR signal emitted from the sensing elements. Otherwise, if the shutter were to reflect some of the IR energy incident from the sensing elements, said elements may perceive some self-reflection, thereby skewing their readings of what is supposed to be a uniform thermal scene presented by the first section 571 of the shutter. Accordingly, some embodiments of the invention provide a high-emissivity coating 573 as part of the first section 571 of the shutter in order to minimize these potentially data-skewing reflections and promote absorption of stray IR signals. A standard solder mask coating as is often found on circuit boards may provide such a coating. Varying values for emissivity may be used, however some embodiments comprise a high-emissivity coating with an emissivity of 0.9 or higher to minimize reflections.

Turning now to the second section 581 of the shutter, which faces away from the IR sensing elements while the shutter is closed, it is beneficial to reflect IR radiation impinging on the second section 581 of the shutter, since absorption may cause undesired heating of the shutter. For this reason, the embodiment shown in FIG. 5 comprises a low-emissivity coating 577 as part of the second section 581 of the shutter; the low emissivity of the material aiding in the reflection of incident IR energy. In some embodiments of the invention, the low-emissivity coating may comprise a gold coating, which conveniently tends not to oxidize and therefore maintain its low emissivity. Varying values for emissivity may be used, however some embodiments comprise a low-emissivity coating with an emissivity value of 0.2 or lower in order to reflect as much energy as possible. A balance of achieving a low-emissivity coating and utilization of low-cost techniques may dictate materials that may be advantageous for such a coating. Additionally, depending on the materials used for the substrate 575 and the low-emissivity coating 577, the coating may not adhere well to the second side 580 of the substrate. In this instance, it may be beneficial to provide a buffer layer 576 between the low-emissivity coating 577 and the substrate 575 to create better adhesion between the substrate 575 and the coating 577. For example, a shutter comprising an FR-4 substrate and a gold low-emissivity coating may further comprise a copper buffer layer between the FR-4 and the gold. One skilled in the art will appreciate that other materials may be used in providing a low-emissivity coating on the second section 581 of the shutter.

FIG. 5 additionally shows the shutter being divided into two areas, generally shown as a first area 502 and a second area 503 separated by dividing line 599. First 502 and second 503 areas generally correspond to two-dimensional boundaries which may be used to describe parts of the shutter encompassed by this boundary in any or all layers. For example, a particular section, such as the first section 571, may comprise subset thereof defined by a two-dimensional boundary and referred to as the first area. The number and relative sizes of areas may vary among embodiments of the invention. In some embodiments, the boundaries defined by the first 502 and second 503 areas may correspond to the boundaries of the flag 402 and stem 403 portions of the shutter, as shown in FIG. 4. Alternatively, the second area may additionally enclose the boundary of the attachment portion 404, thereby encompassing both the stem and attachment portions.

As previously discussed, the attachment portion 404 may connect to means for actuating the shutter such as a motor. The thermally conductive first layer on the first section 571 of the shutter provides an opportunity for any heat generated in the motor or other element near the attachment portion to be conducted into the shutter. Most importantly, it is preferable to prevent this additional heat from travelling into the flag portion 402 of the shutter, as this is the portion seen by the IR sensor elements while the shutter is closed. Additional heating of the flag portion may, among other things, compromise the shutter's ability to present a uniform thermal scene or allow adequate calibration of the sensor elements in the case of a radiometric calculation. Thus, to protect against undesired heating of the flag portion of the shutter, thermal relief cuts may be made in the first thermally conductive layer so as to thermally isolate the flag portion from the attachment portion.

Figure 6:
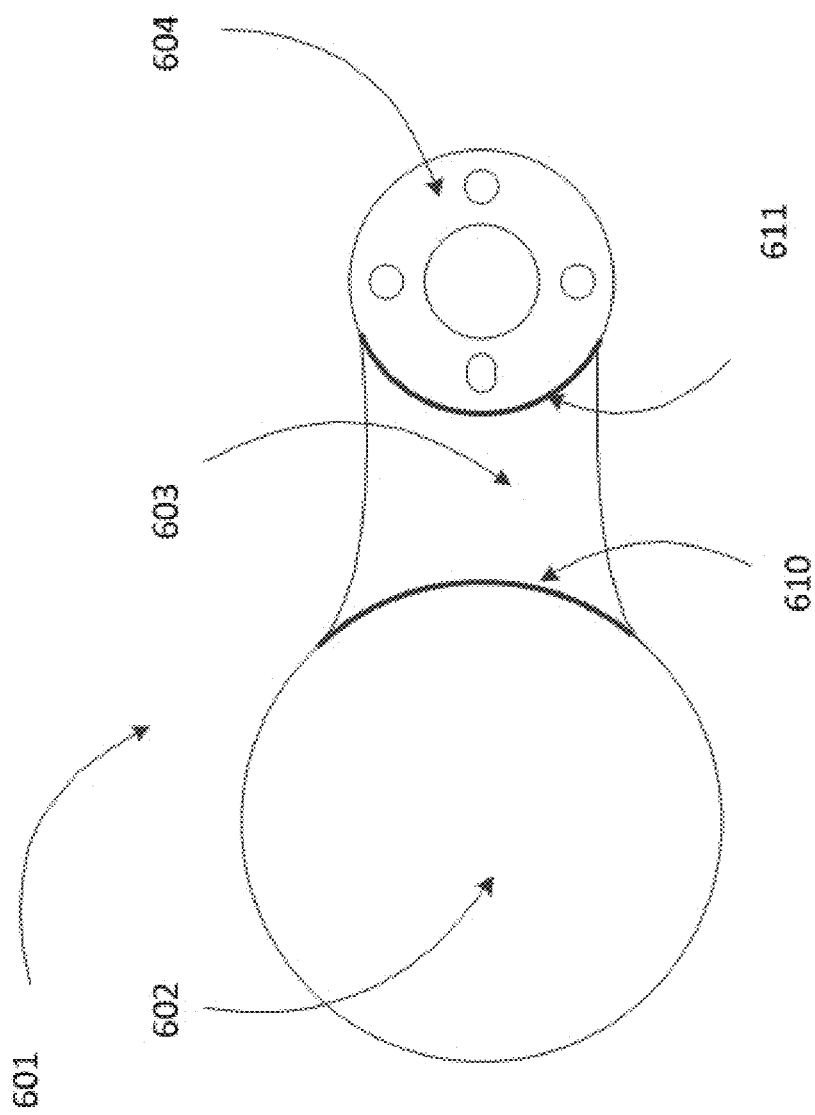
FIG. 6 is a plan view of an embodiment of the shutter illustrating thermal relief cuts

FIG. 6 illustrates thermal relief cuts 610, 611 as implemented in a particular embodiment of the invention. In this embodiment, thermal relief cuts 610 and 611 are made in at least the thermally conducting first layer on the first side of the substrate. As illustrated, thermal relief cut 611 is made between the attachment portion 604 and the stem portion 603 to inhibit heat flow therebetween. An additional thermal relief cut 610 is located between the stem portion 603 and the flag portion 602 to further reduce heat flow into the flag portion 602. In some embodiments, these cuts may be arranged so as to make the thermally conducting first layer discontinuous across the boundary between the flag 602 and the stem 603 portions, while leaving portions of the first layer intact between the stem 603 and the attachment 604 portions. While the name thermal relief cuts may connote that a cut of a continuous material was made to effect the thermal relief cut, it is within the scope of the invention that thermal relief cuts may also be formed by an adjacent positioning of two already cut portions (e.g., flag portion 602 and stem portion 603).

The locations of the thermal relief cuts illustrated in FIG. 6 are exemplary and may be located elsewhere on the shutter to provide substantially the same function. In some embodiments the second section of the shutter may comprise additional thermal relief cuts in order to prevent additional heat flow across portions of the second section of the shutter. Thus, according to various embodiments of the invention, thermal relief cuts may be made in any or all of: the thermally and electrically conducting first layer and the high-emissivity coating of the first section of the shutter, and the buffer layer and the low-emissivity coating of the second section.

Figure 7:
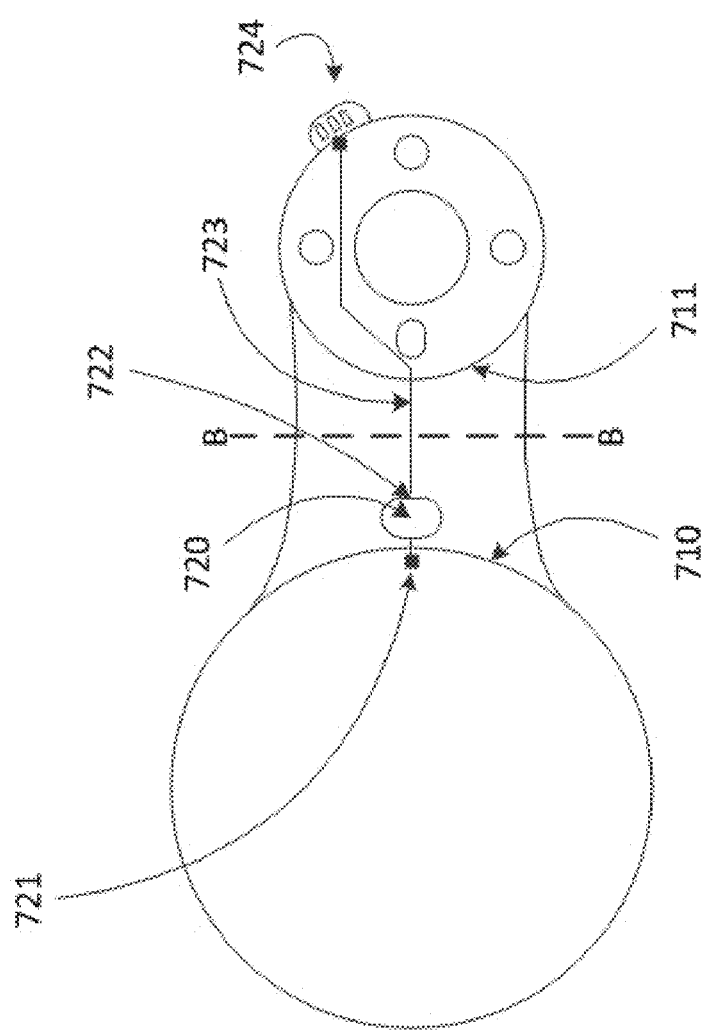
FIG. 7 is a plan view of an embodiment of a shutter for a thermal imaging camera with an incorporated temperature sensor.

In some embodiments of the invention it may be beneficial to measure the temperature of the shutter, such as when used in a calibration process for a radiometric measurement. To accomplish this, a temperature sensor such as a thermistor or a thermocouple may be incorporated into the invention. FIG. 7 shows an embodiment of a shutter for a thermal imaging camera with an incorporated temperature sensor 720. Temperature sensor 720 comprises sensing means 721 for sensing a temperature, and output means 722 for outputting an electrical signal based upon the temperature sensed by the sensing means 721.

Because the flag portion of the first section of the shutter is the portion visible to the IR sensing element while the shutter is closed, the sensing means 721 of the temperature sensor 720 illustrated in FIG. 7 is configured to be in thermal contact with the thermally conductive first layer of the shutter. Since this layer is thermally conductive, measuring its temperature is likely to give a reasonably accurate temperature measurement of the entire flag portion of the first section of the shutter. To minimize non-uniformity of the flag portion due to the implementation of a temperature sensor, the remainder of the temperature sensor 720 assembly may be located separately from the flag portion and thermally isolated therefrom via a thermal relief cut. In some embodiments, output means 722 of the temperature sensor may be electrically coupled to a contact pad in order to relay the electrical signals from the shutter to elsewhere in the camera. In the embodiment of FIG. 7, a contact pad 724 is located on the attachment portion of the shutter and is electrically coupled to the output means 722 of the temperature sensor 720 via a conductive path 723. While illustrated as a single line in FIG. 7, conductive path 723 may comprise a plurality of separate conducting channels which may or may not traverse the same route as the path shown in FIG. 7.

Figure 8:
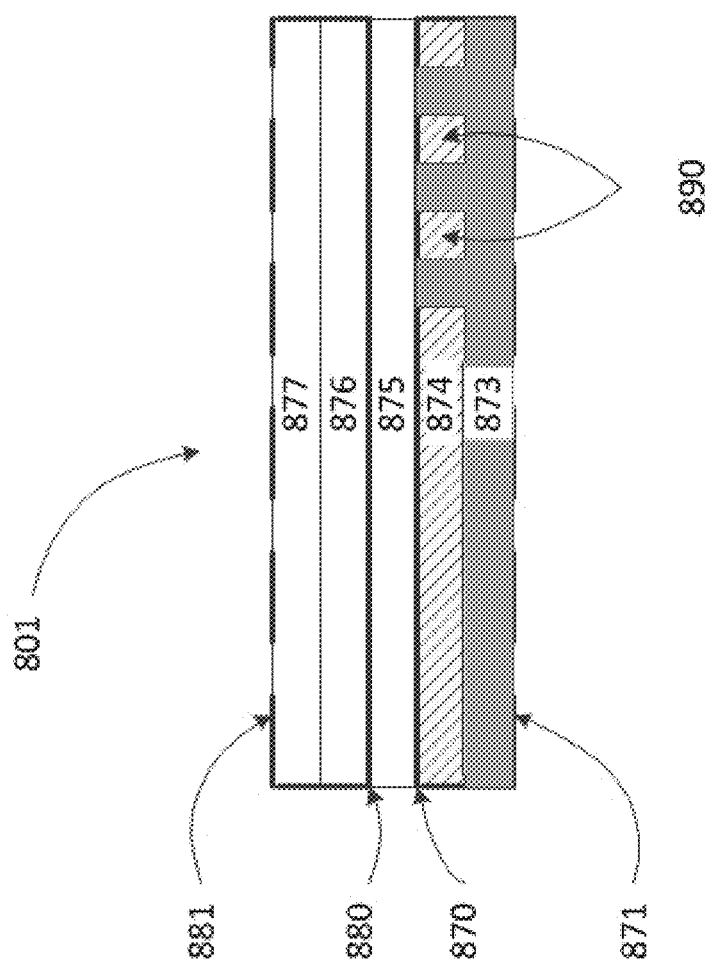
FIG. 8 is a cross-sectional view of the shutter of FIG. 7, taken at B and including isolated conducting channels.

In certain embodiments of the invention, the conductive path between the output elements of the temperature sensor and the contact pad may be made via the electrically conductive first layer on the first side of the substrate. For this to work, however, the first layer cannot be entirely continuous across the shutter. Therefore, isolated conducting channels may be formed in the first layer to provide conduction paths for the electrical signals from the temperature sensor. FIG. 8 shows a cross-sectional view of an embodiment of the shutter of FIG. 7, taken at B and including isolated conducting channels. FIG. 8 shows a similar layered structure as FIG. 5, wherein a substrate 875 is coated with a first layer 874 and a high-emissivity coating 873 on its first side 870, located in a first section 871 of the shutter 801, and a buffer layer 876 and a low-emissivity coating 877 on its second side 880, located in a second section 881 of the shutter 801. In this embodiment, the high-emissivity coating 873 on the first side 870 of the substrate is additionally electrically insulating. In contrast to FIG. 5, however, the first layer 874 is not continuous across the cross-section. Instead, it has been removed in areas to create isolated conducting channels 890 along the substrate. These channels 890 may be made using standard etching or other fabrication techniques applied to the electrically conducting first layer 874, and are surrounded by the electrically insulating high-emissivity coating 873, further isolating these channels 890 from each other and the rest of the electrically conducting first layer 874. For clarity, the high-emissivity coating 873 of FIG. 8 is shaded gray while the conducting first layer 874 is shown as having a crosshatched pattern. It is evident that conducting channels 890 are made of the conductive material of the conducting first layer 874, but are separated by the insulating, high-emissivity material of the high-emissivity coating 873. While FIG. 8 shows two isolated conducting channels 890, one skilled in the art will appreciate that any number of channels may be created and used for conduction of various electrical signals.

In some embodiments, these isolated conducting channels may cross and bridge one or more thermal relief cuts in order to provide electrical communication between components on opposite sides of said cuts, such as a temperature sensor and a contact pad. Accordingly, in some embodiments, the thermal relief cuts may not create a complete discontinuity between two sections in the conductive first layer. For example, in FIG. 7, there is shown a thermal relief cut 711 between the attachment portion and the stem portion of the shutter. However, electrical signals from the output means 722 from the temperature sensor 720 travel down the length of the stem portion via the conductive path 723, across the attachment portion, and connect to the contact pad 724 at the end of the shutter. Were the thermal relief cut 711 to completely isolate the first layer of the attachment portion from the first layer of the stem portion, the contact pad 724 would fail to be in electrical communication with the temperature sensor 720. Thus, thermal relief cuts, such as 711 in FIG. 7, may be themselves discontinuous across the shutter, as in certain embodiments they are designed to allow for conductive paths comprising the conductive first layer to traverse them. However, to maintain the desired attributes achieved by the thermal relief cut such as 711, the cut should render conductive layers at least mostly discontinuous across regions separated by the thermal relief cut, only allowing conductivity between the regions through isolated conduction paths. Other embodiments of the invention may provide alternative means for providing electrical communication across thermal relief cuts.

In a thermal imaging camera, there are advantages to configuring the shutter in such a way so that while closed, it leaves minimal space between it and the adjacent portion of the camera housing the IR sensing elements, thereby allowing minimal radiation to pass around the outside edges of the shutter and impinge on the sensing elements. A temperature sensor included into the first section of the shutter may add an appreciable height offset of the shutter, suggesting the shutter perhaps be moved away from the sensing elements to allow room for the temperature sensor while the shutter moves to and from various positions. However, in some embodiments of the invention, a groove is incorporated into adjacent portions of the camera, allowing the temperature sensor to travel within the groove while the shutter itself maintains close proximity to the adjacent components in order to more effectively block incident IR energy.

Figure 9A:
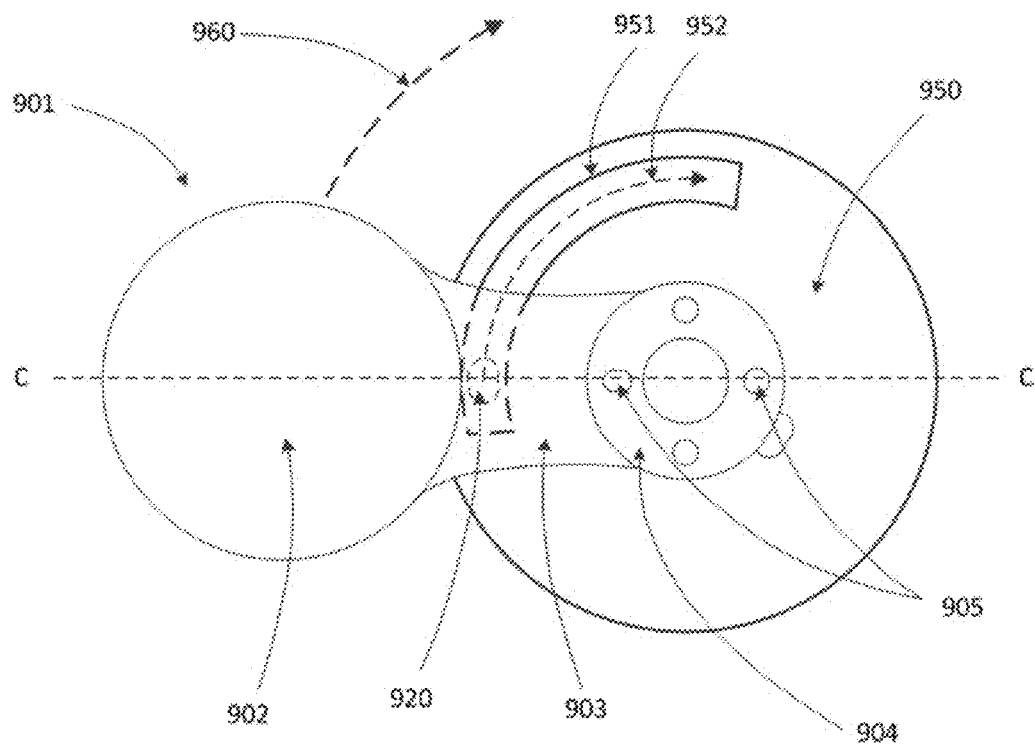
FIG. 9A is a plan view of the shutter located adjacent to a mounting element
Figure 9B:
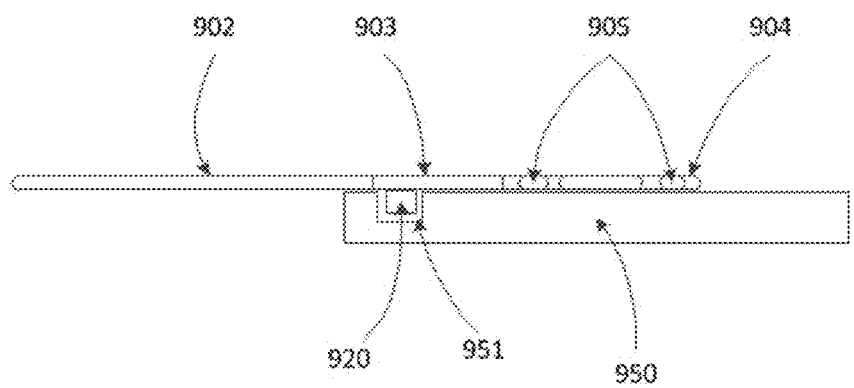
FIG. 9B is a cross-sectional view of FIG. 9A taken at C.

FIGS. 9A and 9B illustrate the aforementioned groove with regard to a certain embodiment of the invention. FIG. 9A shows a plan view of the shutter located adjacent to a mounting element and looking down onto the second section thereof. Elements blocked from view by the shutter are shown in broken line. For example, in this embodiment, temperature sensor 920 is in the first section of the shutters 901, located generally opposite the second and thus blocked from view by the second section and substrate. Accordingly, temperature sensor 920 is represented by a broken line. Also shown in FIG. 9A is a mounting element 950 to which the attachment portion 904 of the shutter attaches, in this embodiment via mounting holes 905. One skilled in the art will appreciate that the shutter may be attached to the mounting element by other means as well. The mounting element 950 may comprise a motor or other movable member allowing for the shutter to transition at least between open and closed states. In this embodiment, the temperature sensor is located above the perimeter of the mounting element. Accordingly, a groove 951 is cut into the mounting element 950 so that the temperature sensor 920 may be located within the confines of the groove 951, as is shown in FIG. 9A.

In this embodiment, the shutter may change states via path 960, wherein the shutter rotates about the attachment portion 904 and the flag portion 902 follows path 960 in a semi-circular manner. As the shutter traverses path 960, it must be that the temperature sensor 920 traverses some path as well, shown here by 952. Accordingly, groove 951 generally follows path 952 as well so that while the temperature sensor 920 travels with the shutter, it may remain within the confines of the groove. This configuration allows the shutters 901 to be located nearer the IR sensing element (not shown) without causing the temperature sensor 920 to collide with the mounting element 950 while the shutter moves.

FIG. 9B shows a cross-section of FIG. 9A taken at C. Elements shown are the shutter 901 with flag 902, stem 903, and attachment 904 portions, and temperature sensor 920. In this embodiment, the shutter is operatively attached to the mounting element 950, which further comprises a groove 951. The groove 951 is configured in such a way so as to receive the temperature sensor 920 while the shutters 901 and the mounting element 950 are operatively coupled, allowing for the shutters 901 to reside nearer to the mounting element and also the IR sensing element (not shown).

In view of the foregoing certain preferred embodiments of the invention are described as follows: A shutter for a thermal imaging camera comprises a flat substrate having a first side and a second side opposite the first made from a flat FR-4 material and further comprises a flag portion, a stem portion, and an attachment portion. The flag portion is configured to cover the IR sensing elements when the shutter is closed, the attachment portion is configured to attach to a motor for positioning the shutter, and the stem portion is configured to couple the attachment and flag portions, separating the two by a distance so that the flag portion sufficiently covers the IR sensing element of the thermal imaging camera when the shutter is closed.

The shutter has a first section, which is operatively attached to the first side of the substrate and which faces the IR sensing elements when the shutter is closed. The first section comprises a layer of copper coating the FR-4 material providing a thermally and electrical conducting first layer. Thermal relief cuts render the copper layer discontinuous across the boundary between the flag and the stem portions and nearly discontinuous across the boundary between the stem and the attachment portions. The first section also comprises a temperature sensor mounted on the stem portion and having its sensing means thermally coupled to the copper on the flag portion. The copper on the stem and attachment portions is patterned to create isolated conducting channels electrically coupled to the output means of the temperature sensor, continuous across the thermal relief cut between the stem and attachment portions, and electrically coupled to a contact pad located on the attachment portion. The first section further comprises an electrically insulating, high-emissivity solder mask coating.

The shutter has a second section, opposite the first and operatively coupled to the second side of the substrate, which has similarly defined flag, stem, and attachment portions. The second section comprises a buffer layer of copper on the FR-4 material and a low-emissivity gold coating on the copper. These metallic layers contain thermal relief cuts across the boundaries between the stem and flag portions and the stem and attachment portions, making the layers discontinuous between all three portions.

As may be noticed by one skilled in the art, the configuration of this exemplary shutter, particularly the first section, very much resembles that of a printed circuit board (PCB). The FR-4 material, the patterned conducting layer, and the solder mask coating are all common elements found in PCB's, allowing the well-known and cost-effective techniques of PCB manufacturing to be applied to the unique application of a shutter for a thermal imaging camera. Accordingly, other PCB techniques and advantages that may be realized by those skilled in the art may also be implemented into the present invention, and fall within the scope thereof. It should be noted, also, that conducting layers on an insulating substrate may be created both constructively and destructively. That is, a conducting layer of the desired topography may be constructed on the surface by methods known in the art, or alternatively, a substantially complete conducting layer may be selectively removed in order to create a desired topography of the conductive layer. Additionally, applying layers and coatings of material to a substrate is a process well-known across many disciplines, and may be accomplished by many techniques. These techniques and advantages thereof may be realized by those skilled in the art to be applicable to the present invention, as a substrate and layer structure is contemplated.

Figure 10:
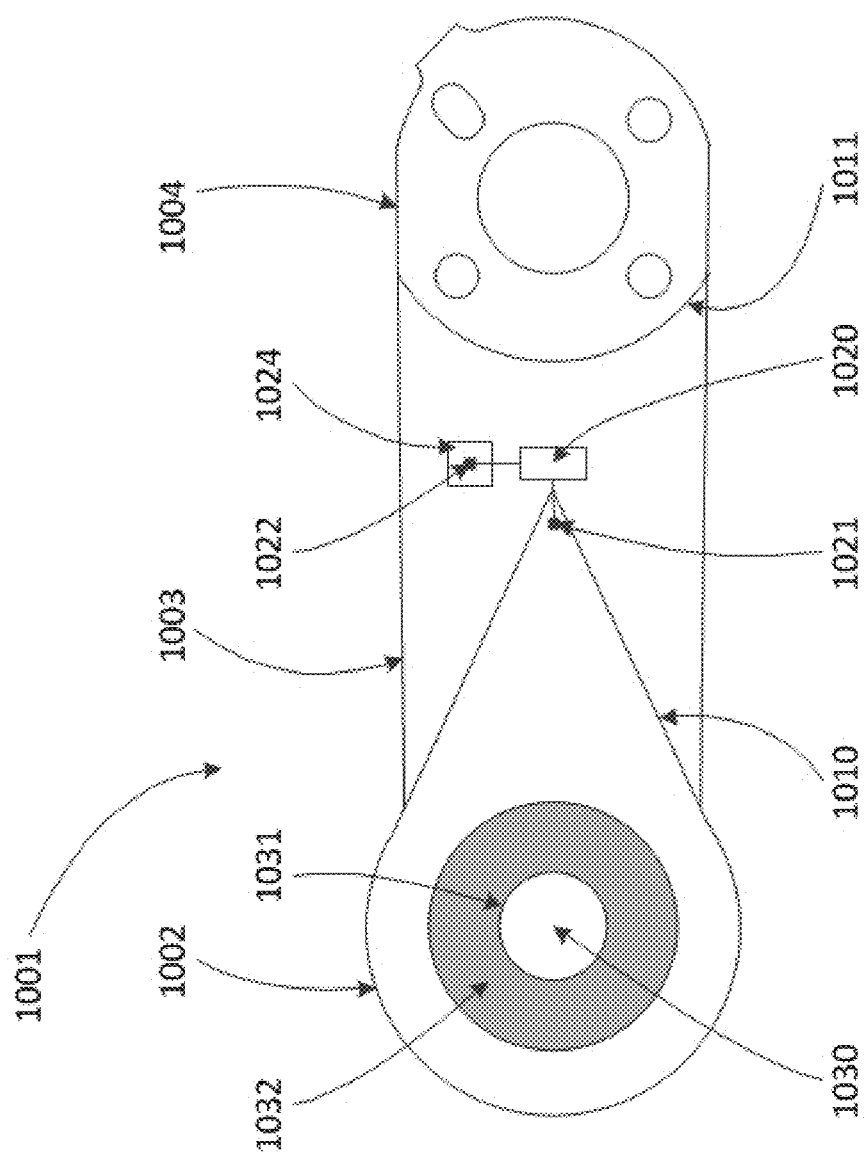
FIG. 10 is a plan view of an alternative embodiment of the shutter of the present invention, further comprising an aperture.

FIG. 10 shows an alternative embodiment of the shutter of the present invention, further comprising an aperture. Similarly to previously described embodiments, the shutter 1001 comprises flag 1002, stem 1003, and attachment portions 1004, and a first section and a second section operatively coupled to first and second sides of a substrate, respectively. The first section comprises a thermally and electrically conductive first layer and a high-emissivity coating and the second section comprises a low-emissivity coating as was the case with previously described embodiments. However, Instead of being designed to block all incident IR radiation from impinging on the IR sensing elements, the shutter of FIG. 10 comprises an aperture 1030 configured to allow a portion of the IR radiation to pass through while blocking/reflecting the remaining incident energy, attenuating the incident IR radiation. This causes the IR sensing elements within the thermal imaging camera to sense less incident energy than if the shutter were not in place, and thus measure a temperature lower than the true temperature of the scene. Calculations performed internal to the camera or on an external device may compensate for this reduction in incident energy and calculate a correct, true temperature of the scene. The advantage of this design is that it allows an optical system to measure a thermal scene that it would have otherwise been unable to due to, for example, limitations of the equipment.

Since the shutter 1001 comprising aperture 1030 of FIG. 10 is meant to block at least a portion of the raw IR signal from reaching the IR sensor elements, it is possible that parts of the shutter 1001 surrounding the aperture 1030 will be in the field of view of the IR sensor elements. Accordingly, it is advantageous for the first section of this shutter (again, the section facing the IR sensor elements coupled to the first side of the substrate) to present a uniform thermal scene, which is facilitated by the thermally conductive first layer. In the case of radiometric measurement, it is useful to know the temperature of the shutter so that the impact of the shutter on the readings of the IR sensor elements may be better known. As such, a temperature sensor 1020 is included, again comprising sensing means and output means. In this embodiment, thermal relief cut 1010 separates the sensing means from the rest of the temperature sensor 1020, with the sensing means 1021 being on the same side of the thermal relief cut 1010 as the aperture so as to accurately measure the temperature of the shutter that is in view of the IR sensing elements. In this embodiment, the output means are not electrically coupled to a contact pad 1024 on the attachment portion, and so there need not be isolated conductive channels crossing thermal relief cut 1011 between the stem and attachment portions. FIG. 10, then, shows another of several possible embodiments of the invention wherein the location, shape, and continuity of thermal relief cuts may vary, along with the location of the temperature sensor and contact pad. Additional thermal relief cuts may be present within the second section of the shutter as well, possibly arranged in the same manner as in the first section.

Turning now to the aperture 1030 of FIG. 10, it is beneficial to have a sharp knife edge 1031 facing the thermal scene while the shutter is in place in order to minimize reflection, interference, or other unwanted optical effects caused by a dull edge. To achieve this, the aperture 1030 is formed by a frustoconical bore 1032, wherein the hole in the first section of the shutter is larger in diameter than that in the second section, the bore 1032 being shaped like a truncated cone. However, with the implementation of the frustoconical bore 1032, there may be a portion of the shutter within the frustoconcial bore 1032, shown as shaded in FIG. 10, visible to the IR sensing elements that is not be coated by the high-emissivity coating of the first section, but rather may comprise the substrate material such as FR-4. This may make more possible the aforementioned reflections of IR energy originating from the IR sensing elements back into themselves, skewing the thermal data. To fix this, the shutter may further comprise an additional, second high-emissivity coating applied to this area in order to minimize reflections. The second high-emissivity coating may comprise the same material as the original high-emissivity coating, or it may be different, possible coatings comprising solder mask, paint, or other high-emissivity materials.

In some embodiments, the shutter of FIG. 10 may be used in conjunction with a shutter such as the one shown in FIG. 7. In certain embodiments, these two shutters are separately attached in a thermal imaging camera, each having means by which to position the shutter such as a motor. In different embodiments, both shutters may be closed simultaneously and move independently of one another. A single shutter serving both purposes is also contemplated, wherein a single attachment and stem lead to two flag portions of a shutter—one with an aperture as in FIG. 10 and one without as in FIG. 7. An additional embodiment of the invention may include two flag portions, each comprising apertures of different size. Embodiments of the invention comprising multiple flag portions may be arranged such that the flag portions are substantially side-by-side, wherein the shutter rotates about a point such as the attachment portion in order to select which flag portion is being used. Additional embodiments may be configured such that the shutter is moved translationally in order to select which flag portion is being used. Other configurations are also possible, as will be appreciated by those skilled in the art.

Some of the techniques described in this disclosure may also be embodied or encoded in a computer-readable medium, such as a non-transitory computer-readable storage medium containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), a hard disk, optical media, or other computer readable media. Such techniques may comprise utilizing such computer-readable medium in conjunction with a shutter as described above in order to perform calibrations and/or calculations regarding the thermal imaging camera, such as sensor biasing or radiometric calculations.

Various examples and features of shutters and thermal imaging cameras which may comprise them have been described. Such descriptions are exemplary in nature and do not define the limitations of the invention. Rather, examples described herein comprise embodiments that, along with other examples, are within the scope of the following claims.

The invention claimed is:

1. A shutter for a thermal imaging camera for selectively covering at least part of an infrared sensor element, the shutter comprising:
    a generally flat, thermally and electrically insulating substrate having a first side and a second side, the second side generally opposite the first;
    a flag portion used to selectively cover the infrared sensor element;
    a stem portion located adjacent to the flag portion;
    a first section, operatively coupled to the first side of the substrate, the first section comprising:
        a first layer that is both thermally and electrically conductive,
        a second layer that is electrically insulating and having a high emissivity, and
        a temperature sensor having a sensing element for sensing a temperature and an output for outputting an electrical signal corresponding to a sensed temperature, the sensing element being thermally coupled to the first layer; and
    a second section operatively coupled to the second side of the substrate, the second section comprising a low-emissivity coating; and wherein the thermally and electrically conductive first layer is at least partially discontinuous across the boundary between the flag and stem portions by a first thermal relief cut.

2. The shutter of claim 1, wherein the thermally and electrically conductive first layer is entirely discontinuous between the flag and stem portions of the shutter.

3. The shutter of claim 2, wherein the sensing element of the temperature sensor is thermally coupled to the first layer on the flag portion of the shutter and the output of the temperature sensor is electrically coupled to the first layer on the stem portion.

4. The shutter of claim 1, wherein the shutter further comprises an attachment portion, located adjacent to the stem portion for attaching the shutter to the thermal imaging camera.

5. The shutter of claim 4, wherein the thermally and electrically conductive first layer is rendered at least mostly discontinuous across the boundary between the stem portion and the attachment portion by a second thermal relief cut.

6. The shutter of claim 5, wherein the second section of the shutter comprises at least one thermal relief cut, located generally opposite at least one of the first and second thermal relief cuts in the first section.

7. The shutter of claim 1, wherein the low-emissivity coating of the second section is a gold coating.

8. The shutter of claim 1, wherein the second section further comprises an intermediate buffer layer between the substrate and the low emissivity coating.

9. The shutter of claim 8, wherein the intermediate layer is a copper layer.

10. The shutter of claim 1, wherein the high-emissivity second layer comprises a solder mask coating.

11. The shutter of claim 1, wherein the thermally and electrically conductive first layer is patterned to form isolated, conducting channels in electrical communication with the output of the temperature sensor.

12. The shutter of claim 1, further comprising a contact pad for relaying the electrical signal from the output of the temperature sensor to a component separate from the shutter.

13. A thermal imaging camera with a shutter for selectively covering at least part of an infrared sensor element, the shutter comprising:
    a generally flat, thermally and electrically insulating substrate having a first side and a second side generally opposite the first side;
    a first section, operatively coupled to the first side of the substrate, the first section comprising:
        a layer that is both thermally and electrically conductive,
        a first area defined by a two-dimensional boundary substantially parallel to the first side of the substrate,
        a second area defined by a two-dimensional boundary substantially parallel to and not overlapping the boundary defining the first area, the second area being thermally and electrically insulated from the first area, and
        a temperature sensor having a sensing element for sensing a temperature and an output for outputting an electrical signal corresponding to a sensed temperature, the sensing element being thermally coupled to the layer in the first area;
    a second section operatively coupled to the second side of the substrate, the second section comprising a low-emissivity coating; and
    a groove for receiving the temperature sensor and allowing the temperature sensor to travel therein as the shutter moves.

14. The thermal imaging camera of claim 13, wherein the first area defines a flag portion, used to selectively cover the infrared sensor element, and the second area comprises a stem portion located adjacent to the flag portion, wherein the thermally and electrically conductive layer is at least partially discontinuous across the boundary between the flag and stem portions by a first thermal relief cut.

15. The thermal imaging camera of claim 14, wherein the second area further comprises an attachment portion, located adjacent to the stem portion for attaching the shutter to the thermal imaging camera.

16. The thermal imaging camera of claim 15, further comprising a motor, configured to move the shutter and attached thereto via the attachment portion.

17. The thermal imaging camera of claim 16, wherein the motor is a piezo motor.

18. The shutter of claim 13, wherein the thermally and electrically conductive layer in the first section is entirely discontinuous between the first and second areas of the shutter.

19. A shutter for selectively covering at least part of an infrared sensor element in a thermal imaging camera that provides a thermal image of a high temperature scene, the shutter comprising:
    a generally flat, thermally and electrically insulating substrate having a first side and a second side generally opposite the first side;
    a flag portion used to selectively cover the infrared sensor element;
    a stem portion located adjacent to the flag portion;
    a first section, operatively coupled to the first side of the substrate, the first section comprising:
        a first layer that is both thermally and electrically conductive,
        a second layer that is electrically insulating and having a high emissivity,
        a first area defined by a two-dimensional boundary substantially parallel to the first side of the substrate,
        a second area defined by a two-dimensional boundary substantially parallel to and not overlapping the boundary defining the first area, the second area being thermally and electrically insulated from the first area, and
        a temperature sensor having a sensing element for sensing a temperature and an output for outputting an electrical signal corresponding to a sensed temperature, the sensing element being thermally coupled to the first layer in the first area;
    a second section operatively coupled to the second side of the substrate, the second section comprising a low-emissivity coating; and
    an aperture in order to block only a portion of incident IR radiation from being sensed by the thermal imaging camera; and wherein
    the thermally and electrically conductive first layer is at least partially discontinuous across the boundary between the flag and stem portions by a first thermal relief cut.

20. The shutter of claim 19, wherein the aperture is located in the flag portion of the shutter.

21. The shutter of claim 19, wherein the thermally and electrically conductive first layer is entirely discontinuous between the first and second areas of the shutter.

* * * * *